United States Patent
Seufert et al.

(10) Patent No.: US 8,055,402 B2
(45) Date of Patent: Nov. 8, 2011

(54) FAULT-DETECTION METHODS FOR MOTOR VEHICLE GEARBOXES

(75) Inventors: Martin Seufert, Steinheim (DE); Ralf Hettich, Filderstadt (DE); Josef Glatthaar, Oberndorf (DE); Ralph Richter, St. Georgen (DE); Tobias Kalisch, Villingen-Schwenningen (DE); Marius Bryzgalski, St. Georgen (DE); Joerg Moellmann, München (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 12/756,139

(22) Filed: Apr. 7, 2010

(65) Prior Publication Data
US 2010/0305802 A1 Dec. 2, 2010

Related U.S. Application Data

(63) Continuation of application No. PCT/EP2008/007473, filed on Sep. 11, 2008.

(30) Foreign Application Priority Data

Oct. 17, 2007 (DE) .................. 10 2007 051 064

(51) Int. Cl.
*G06F 19/00* (2006.01)
(52) U.S. Cl. .......................... 701/29; 477/77
(58) Field of Classification Search .............. 701/51, 701/36, 29, 54; 477/78, 77; 702/56, 183; 74/866; 192/84.6, 99
See application file for complete search history.

(56) References Cited

U.S. PATENT DOCUMENTS

| 5,113,720 | A | * | 5/1992 | Asayama et al. ............. 74/335 |
| 5,548,513 | A | * | 8/1996 | Masuda et al. ................ 701/90 |
| 5,991,679 | A | | 11/1999 | Sigg |
| 7,500,932 | B2 | * | 3/2009 | Katakura et al. ............ 475/123 |
| 7,912,614 | B2 | * | 3/2011 | Honma et al. ................. 701/51 |
| 2002/0111732 | A1 | | 8/2002 | Jager et al. |
| 2004/0038776 | A1 | * | 2/2004 | Kuhstrebe et al. ............ 477/77 |
| 2005/0258014 | A1 | | 11/2005 | Berger et al. |
| 2006/0037422 | A1 | | 2/2006 | Kuhstrebe et al. |

FOREIGN PATENT DOCUMENTS

| DE | 195 36 339 A1 | 4/1997 |
| DE | 199 58 075 A1 | 6/2000 |
| DE | 199 04 237 A1 | 8/2000 |
| DE | 101 60 308 A1 | 7/2002 |
| DE | 103 08 713 A1 | 10/2003 |
| EP | 1 610 023 A | 12/2005 |
| WO | WO 2005/008030 | 9/2005 |

* cited by examiner

*Primary Examiner* — Thomas Black
*Assistant Examiner* — Marthe Marc-Coleman
(74) *Attorney, Agent, or Firm* — Knobbe, Martens, Olson & Bear, LLP

(57) ABSTRACT

A method for detecting a fault state in an automated motor vehicle gearbox having two parallel branches. Each branch has a clutch and is configured to transmit driving torques from a drive unit to at least one driven wheel of the motor vehicle. The method comprises the steps of sensing whether both clutches are at least partially closed; of sensing the rotational speed of the at least one driven wheel and sensing the rotational speed of a non-driven wheel, and of detection of a fault state if both clutches are at least partially closed, and a difference between the rotational speeds of the wheels is greater than a predetermined reference value.

12 Claims, 4 Drawing Sheets

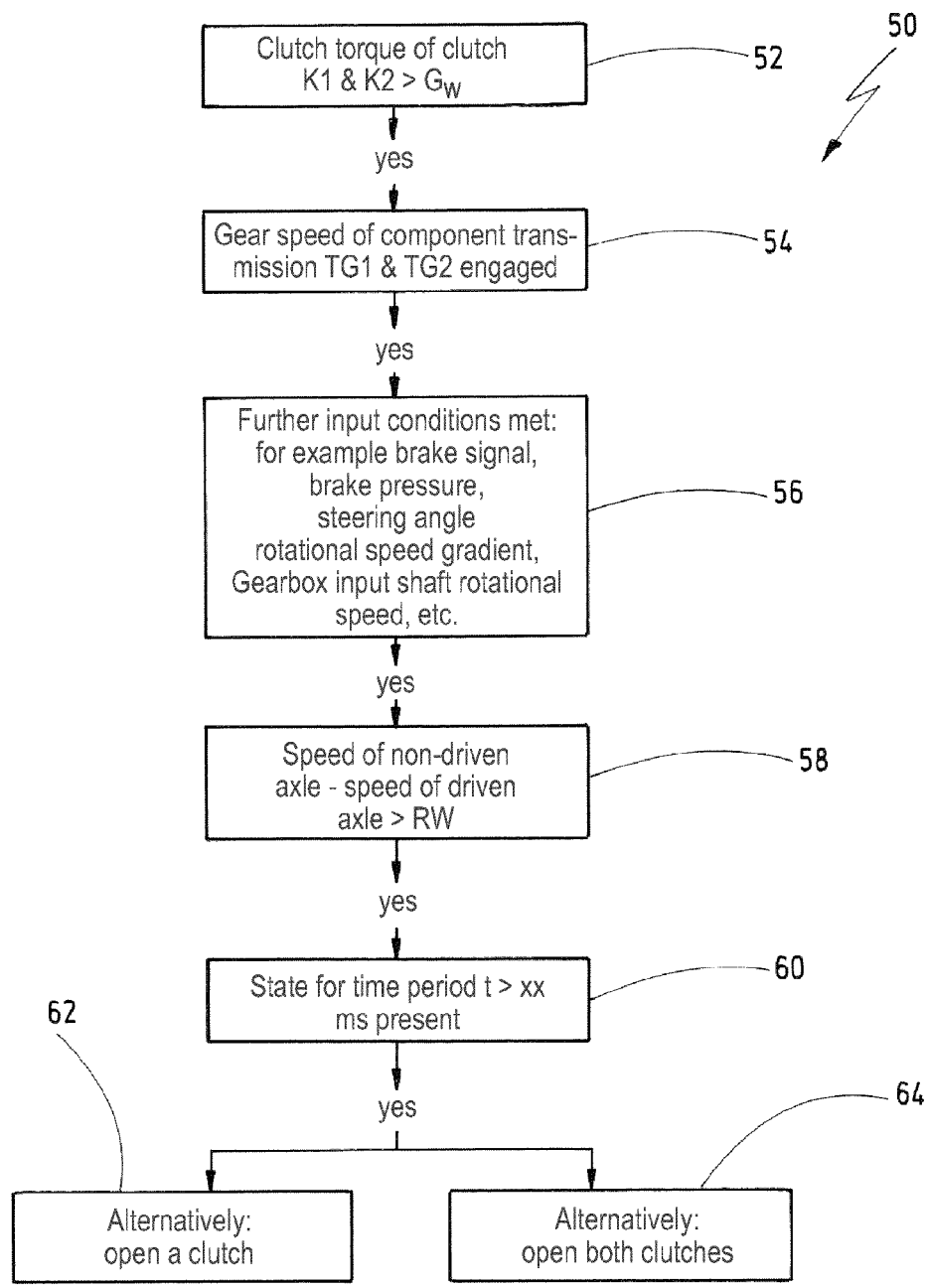

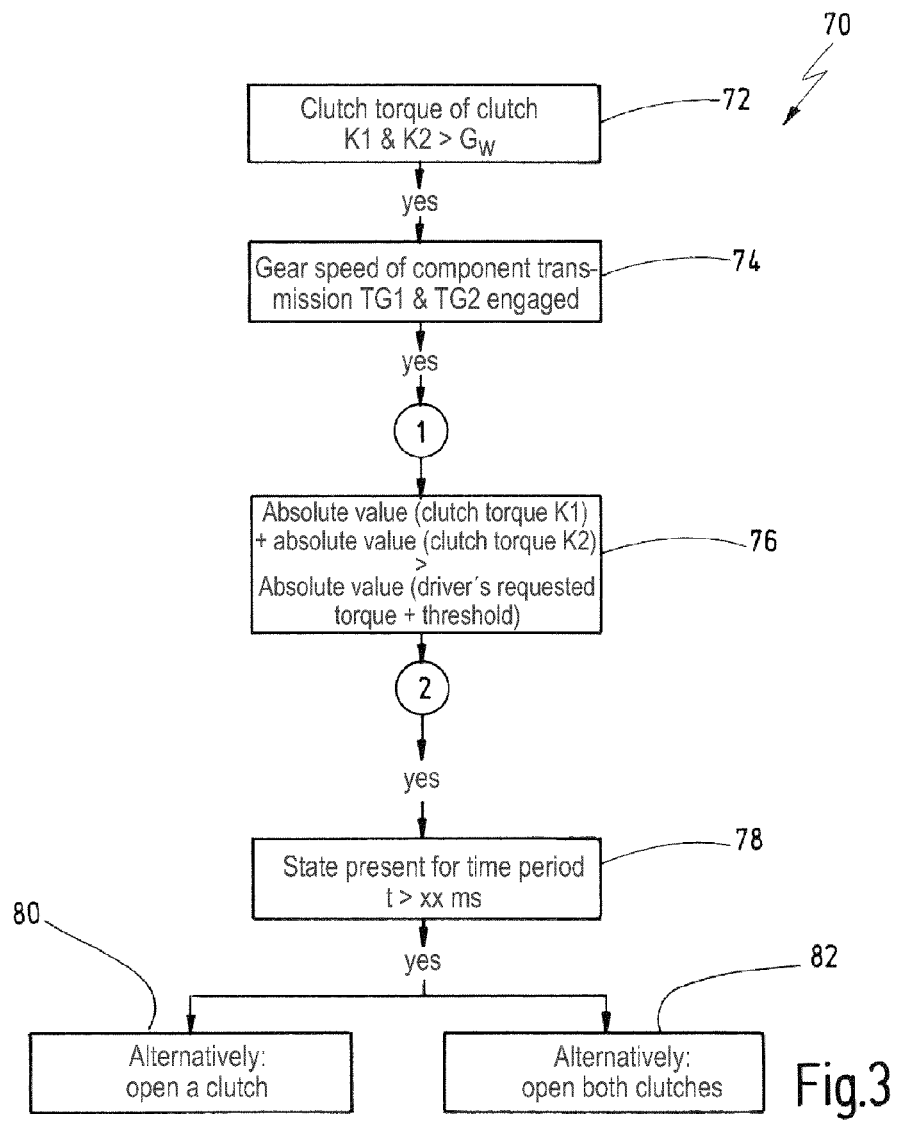
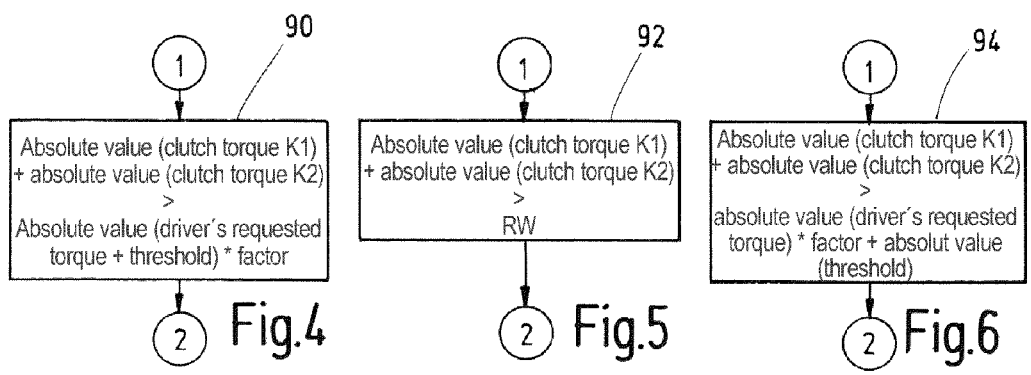

FAULT-DETECTION METHODS FOR MOTOR VEHICLE GEARBOXES

CROSS REFERENCE TO RELATED APPLICATIONS

This is a Continuation application of International patent application PCT/EP 2008/007473, filed Sep. 11, 2008, which claims the priority of German patent application DE 10 2007 051 064, filed Oct. 17, 2007.

BACKGROUND OF THE INVENTION

The present invention relates to methods for detecting a fault state in an automated motor vehicle gearbox, and to methods for bringing about a safe state when such a fault state has occurred.

Such a fault-detection method may be applied, in particular, in the field of double-clutch gearboxes.

Double-clutch gearboxes have two parallel component transmissions (branches), which are each assigned a separate friction clutch (dry running or wet running).

The input elements of the friction clutches are connected to a drive unit such as, for example, an internal combustion engine. However, the drive unit can also be an electric motor or a hybrid drive unit.

The uneven gear stages (1, 3, 5, . . . ) are assigned to one of the component transmissions. The even gear stages (2, 4, 6, . . . ) are assigned to the other component transmission.

The driving power is generally transmitted from the drive unit to driven wheels of a motor vehicle via one of the two component transmissions. A gear stage is generally preselected in the respective non-active component transmission. A change of gear speed from the starting gear speed of the active component transmission to the target gear speed of the inactive gearbox can be effected by overlapping activation of the input-side friction clutches. This overlapping activation can be carried out in such a way that there is no interruption in the traction force during the change of gear speed.

The corresponding actuation of the friction clutches and the engagement and disengagement of gear stages generally takes place in an automated fashion by means of a superordinate control unit. This control unit can also be connected to a control unit for the drive unit. In this context, it goes without saying that the control unit selects the torque transmitted via the respective friction clutches and the transmission ratios which have been set up at the respective component transmissions in such a way that said torques and said transmission ratios are adapted to the current driving situation (speed of the vehicle, traction conditions or overrun conditions etc.).

Automated motor vehicle gearboxes have to meet high safety requirements.

BRIEF SUMMARY OF THE INVENTION

The object of the invention is therefore to specify a method for detecting a fault state in an automated motor vehicle gearbox and a method for bringing about a safe state if such a fault state is sensed.

The above object is achieved according to a first aspect of the present invention by means of a method for detecting a fault state in an automated motor vehicle gearbox having two parallel branches which each have a clutch and are configured to transmit driving torque from a drive unit to at least one driven wheel of the motor vehicle, having the steps sensing whether the clutches are at least partially closed;

sensing the rotational speed of the at least one driven wheel and sensing the rotational speed of a non-driven wheel; and detection of a fault state if both clutches are at least partially closed, and a difference between the rotational speeds of the wheels is greater than a predetermined reference value.

The method according to the invention according to the first aspect can be implemented comparatively easily since the rotational speeds of the driven wheel and of the non-driven wheel are generally available in any case as measurement variables. This applies, in particular, in the case of vehicles which have an ABS system or ESP system.

The above object is achieved according to a second aspect of the present invention by means of a method for detecting a fault state in an automated drive train of a motor vehicle, which drive train has a drive unit, at least one friction clutch whose input is connected to an engine shaft, and a multi-step gearbox having at least one drive shaft which is connected to an output of the clutch, having the steps:

sensing whether the at least one clutch is at least partially closed;

sensing an output shaft rotational speed of the multi-step gearbox;

sensing at least one further parameter, selected from the rotational speed of the engine shaft, the rotational speed of the at least one drive shaft, the position of the at least one clutch and of the torque transmitted via the at least one clutch; and logic combination of the output shaft rotational speed with the further parameter, and comparison of the logic combination with a reference value, in order to detect the fault state.

The method according to the second aspect of the invention can, in particular, be implemented easily if the wheel speeds are not available, for example in vehicles which are not equipped with an ABS or ESP system.

According to a third aspect of the present invention, the above object is achieved by means of a method for detecting a fault state in an automated motor vehicle gearbox, in which method driving torque can be transmitted to at least one driven wheel via a first and a second parallel branch, wherein a clutch is provided in each branch, having the steps:

sensing of the torque transmitted via the first clutch;

sensing of the torque transmitted via the second clutch;

sensing whether a gear speed is engaged in both branches; and detection of a fault state if a gear speed is engaged in both branches and if a sum of the torques transmitted via the first and second clutches is greater than a specific reference value.

The method according to the third aspect of the present invention proceeds from the basic idea that the sum of the torques transmitted via the two branches of the motor vehicle gearbox must not exceed a respective specific value. This specific value (reference value) can be a fixed value, but can also be a variable which depends on diverse parameters. Application in all-wheel vehicles is readily possible.

The term of reference value is therefore to be understood above as generally meaning either a fixed value, a variable value, a characteristic curve or a characteristic diagram.

By means of the methods according to the invention it is possible, in particular, to sense a state which leads to a decelerated drive axle, that is to say when the driven axle (the driven wheel) is rotating more slowly than the non-driven axle (the non-driven wheel). This may be, for example, a fault state which is caused by the fact that too much torque for a set-up transmission ratio is transmitted via the two clutches. Such a fault state may lead, under certain circumstances, to instability of the vehicle. This applies in particular, but not exclusively, to travelling on carriageways with a reduced coefficient of friction.

With the methods according to the invention it is therefore possible, in particular, to detect a fault state in the form of a stressed state of the drive train and to eliminate it through suitable measures. Such a stressed state may occur, in particular, during a change of gear speed while the power flux is being transferred from one parallel branch to the other parallel branch. This is relevant, in particular, in the case of double-clutch gearboxes in which such a transfer of the power flux occurs under load. However, the methods according to the invention can also be applied in a similar way to automatic converter transmissions in which two parallel branches can also be shifted under load (for example one clutch for a first gear speed and a second clutch for a second gear speed). In addition, the methods according to the invention can also be applied in automated manual transmissions (AMT), in particular if the clutches used there are configured to carry out changes of gear speed in an overlapping fashion under load.

In other words, such a stressed state can occur during a change of gear speed when a clutch of a source gear speed opens too late and/or a clutch of a target gear speed is engaged too early. In this context, such a stressed state may basically occur in all driving states. This becomes particularly relevant if the drive axle is decelerated by the stressed state. Accordingly, the methods according to the invention become of particular importance, in particular when the vehicle is already in an overrun state, that is to say, for example, shifting back takes place under overrun conditions. The deceleration of the drive axle which occurs in such a context may be of such magnitude that the frictional engagement between the driven wheel and the surface of the carriageway is lost. This of course becomes problematic particularly on carriageways with a low coefficient of friction.

In addition, the methods according to the invention can be applied to vehicles with a front drive, rear drive and all-wheel drive. In particular when the methods are applied to vehicles with a rear wheel drive it is problematic that the stability of the vehicle suffers when the frictional engagement at the rear axle is lost.

The methods according to the invention are respectively configured to detect in good time such a stressed state in order to be able to take suitable measures such as, for example, the at least partial opening of at least one of the two clutches (or the further disconnection of the parallel branches, for example by disengaging gear speeds or the like).

In addition, the fault-detection methods according to the different aspects of the invention can either be used alternatively or cumulatively. It is also possible to apply the different methods as a function of the state which the vehicle is currently in.

In the fault-detection method according to the invention according to the third aspect of the present invention, it is of particular advantage if the fault state is detected under the additional condition that the absolute value sum of an absolute value of the torque transmitted via the first clutch and of an absolute value of the torque transmitted via the second clutch is greater than a reference value.

Since the torques which are transmitted via the clutches can generally be signed, the formation of absolute values implements a relatively high degree of reliability in terms of fault detection. In other words, a fault state can be detected even if the torque which is transmitted via the one clutch is positive and the torque which is transmitted via the other clutch is negative.

Within the scope of the present invention, the sign of the torque which is transmitted via a respective clutch is to be calculated by comparing the rotational speeds of the input element and output element of the corresponding clutch. A positive sign is obtained if the rotational speed of the input element is higher than the rotational speed of the output element. This applies, for example, if the rotational speed of the drive unit is higher than the rotational speed of the drive shaft of a component transmission which is present in the respective branch. In a corresponding way, a negative sign of the torque transmitted via the clutch occurs if the rotational speed of the input element is lower than the rotational speed of the output element of the respective clutch.

It is of particular advantage if the reference value is a function of the requested torque which is requested by a driver of the motor vehicle.

The requested torque which is requested by the driver occurs in an internal combustion engine, for example as a result of the respective position of a throttle valve, and in electric drive units, for example on the basis of the electric motor current. In addition, the requested torque can, if appropriate, also be derived from other states of the vehicle and/or the position of the accelerator pedal. The method of detecting the requested torque can be freely selected in the present context.

As a result of the measure of making the detection of a fault state dependent on which torque is requested by a driver of the motor vehicle, the detection of the fault state can be carried out more safely and/or adaptively.

According to a further embodiment, the reference value is formed by the absolute value of the sum of the driver's requested torque and a threshold value.

This can implement a certain safety range.

It is alternatively or additionally also possible to form the reference value by the result of a multiplication of an absolute value of a sum, which is formed from the driver's requested torque and a threshold value, by a factor.

This measure permits an even higher level of safety to be achieved.

In addition, it is alternatively or cumulatively possible that the reference value is formed by the sum of the result of a multiplication of an absolute value of the driver's requested torque by a factor and of an absolute value of a threshold value.

The formation of absolute values again permits a higher safety level range to be set.

In addition it is alternatively possible that the reference value is a value which is independent of the driver's requested torque and which, as mentioned above, can be a fixed value, a variable value, a characteristic curve or a characteristic diagram (as a function of, for example, states of the vehicle).

According to a further alternative embodiment, the fault state is detected under the additional condition that a negative output torque resulting at the driven wheel is not too large.

In this embodiment of the method according to the third aspect of the present invention, it is possible, in particular, to include the signed torques which are transmitted by the clutches.

In a first embodiment, the fault state is detected under the additional condition that both clutches are in a slipping state.

In this embodiment it is particularly preferred if the fault state is detected under the additional condition that the sum of (i) a signed torque transmitted via the first clutch and multiplied by the transmission ratio which has been set up in the assigned branch, and of (ii) a signed torque transmitted via the second clutch and multiplied by the transmission ratio, which has been set up in the assigned branch, is smaller than a reference value which is the negative absolute value of the result of a multiplication of the (i) sum of the driver's requested torque and a threshold value by the (ii) lower of the transmission ratios.

In this embodiment, as stated above, it is assumed that both clutches are in a slipping state. The detection of the fault state is made dependent on the signed torques which are transmitted via the respective clutches.

According to a further embodiment of the third aspect of the present invention, the fault state is detected under the additional condition that just one of the two clutches is in a slipping state.

It goes without saying here that the other clutch is preferably in a completely closed state.

In this embodiment it is preferred if the fault state is detected under the additional condition that the sum of (i) the result of a multiplication of a torque, made available by the drive unit, by the transmission ratio which is set up in the branch which is assigned to the non-slipping clutch and of (ii) the result of a multiplication of a signed torque, transmitted via the slipping clutch, by the difference between the transmission ratio which is set up in the branch which is assigned to the slipping clutch and the transmission ratio which is set up in the branch which is assigned to the non-slipping clutch, is smaller than a reference value which is the negative absolute value of the result of a multiplication of the (i) sum of the driver's requested torque and a threshold value by the (ii) lower of the transmission ratios.

In this embodiment, the summing of the torques which are transmitted via the clutches can easily be calculated with respect to the non-slipping clutch from the engine torque.

Overall it is also preferred if, before the fault state is detected, at least one further state of the motor vehicle is checked in order to avoid incorrect detections of a fault state.

In other words, further input conditions, for example a brake signal, a brake pressure, a steering angle, a rotational speed gradient, and/or a transmission input shaft rotational speed etc., can be checked in advance.

In addition it is also preferred if the clutch is a friction clutch.

Generally, although the methods according to the invention could also be applied in pure shifting clutches, the methods according to the invention are particularly preferably applied in friction clutches which can be actuated in a slipping state.

In the methods according to the invention it is preferred if a fault state is detected when the fault state is present for a predetermined time period of greater than zero.

This makes it possible to avoid a fault state being inadvertently detected owing, for example, to very briefly occurring maximum values and/or minimum values of the rotational speeds.

Of course, the methods according to the invention can, in particular, be applied in double-clutch gearboxes. However, it is also generally possible to apply the methods according to the invention in other types of motor vehicle gearboxes such as, for example, in automatic converter transmissions or else in automated manual transmissions (AMT).

The torque which is transmitted by a clutch can be derived from direct or indirect actuator variables (for example from the setpoint current of an electric motor or of a valve, from the actual current of an electric motor or a valve, or from the clutch pressure etc.).

In addition it is conceivable to combine the different methods in such a way that they are applied in different phases of a shift state or of a stressed state (for example a clutch slips, a clutch sticks, both clutches stick etc.).

It goes without saying that the features mentioned above and the features still to be explained below can be used not only in the respectively specified combination but also in other combinations or alone, without parting from the scope of the present invention.

BRIEF DESCRIPTION OF THE SEVERAL VIEWS OF THE DRAWINGS

Exemplary embodiments of the invention are illustrated in the drawing and will be explained in more detail in the following description, in which:

FIG. 2 shows a flowchart of an embodiment of the method according to the first aspect of the invention;

FIG. 2a shows a modification of the method shown in FIG. 2 according to a second aspect of the invention;

FIG. 3 shows a flowchart of a preferred embodiment of a method according to the third aspect of the present invention;

FIG. 4 shows a modification of the method in FIG. 3;

FIG. 5 shows a modification of the method in FIG. 3;

FIG. 6 shows a modification of the method in FIG. 3; and

DETAILED DESCRIPTION OF THE INVENTION

Figure 1:
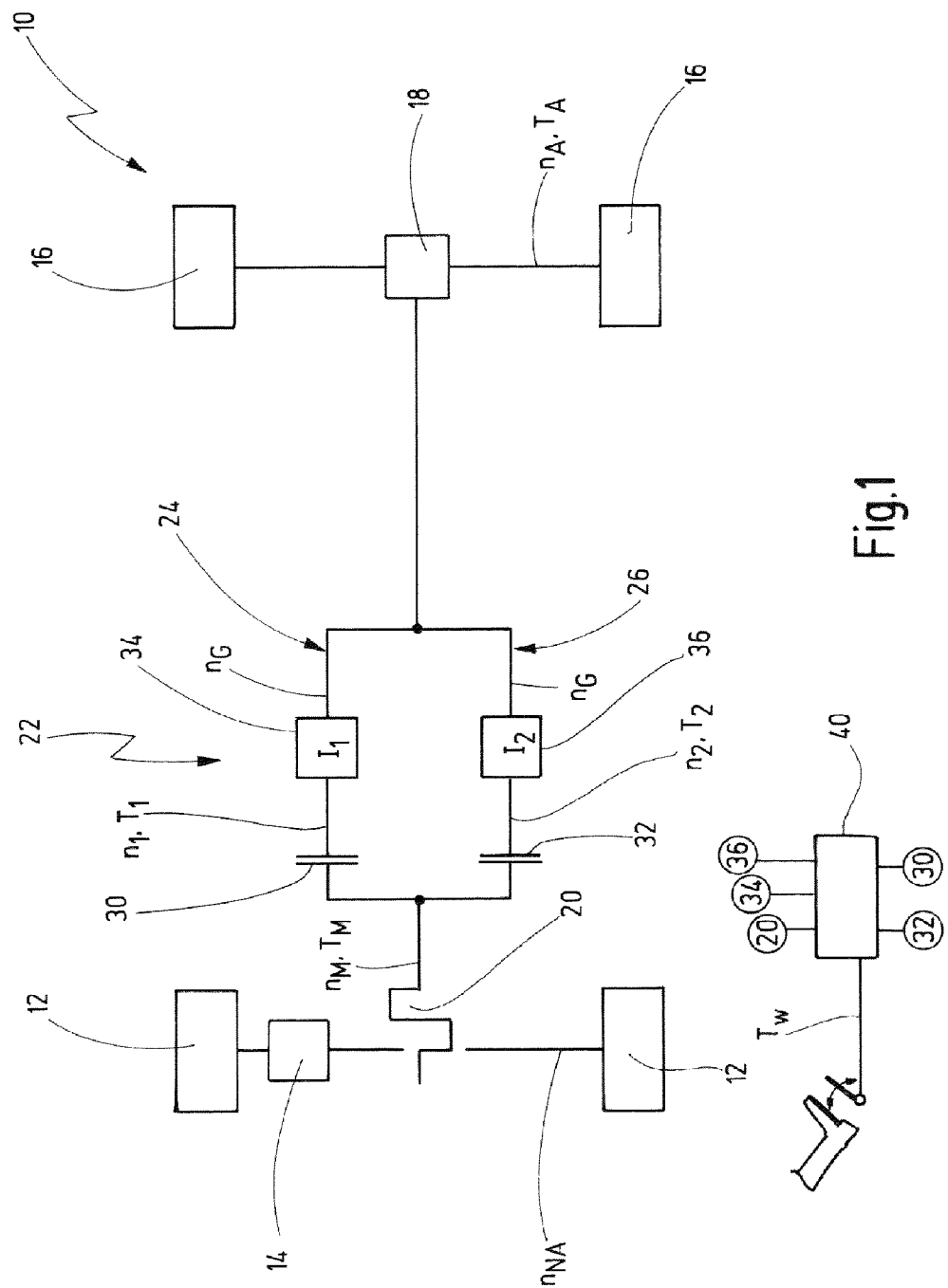
FIG. 1 shows a schematic illustration of an embodiment of a motor vehicle gearbox in the form of a double-clutch gearbox to which the methods according to the invention can be applied.

In FIG. 1, a motor vehicle is illustrated in schematic form and denoted by 10. The motor vehicle 10 is, for example, a passenger car which has a non-driven axle with non-driven wheels 12. In an all-wheel vehicle, the wheels 12 can also be driven wheels which are connected to one another via a differential 14. In addition, the motor vehicle 10 has a driven axle with driven wheels 16 which are connected to one another via a differential 18. The motor vehicle 10 has a drive train with a drive unit 20 which can be formed, for example, by an internal combustion engine, a hybrid motor or a pure electric motor. The drive train also includes a double-clutch gearbox 22. The double-clutch gearbox 22 has, in a known fashion, a first branch 24 and a second branch 26.

A first friction clutch 30 is provided in the first branch 24. A second friction clutch 32 is provided in the second branch 26. A first component transmission 34 is present in the first branch 24, and a second component transmission 36 is present in the second branch 26.

The input elements of the friction clutches 30, 32 are connected to an output shaft of the drive unit 20. The output elements of the friction clutches 30, 32 are connected to the respective component transmissions 34, 36. The component transmissions 34, 36 can be embodied as spur gear mechanisms with a plurality of gear stages. A first transmission ratio $I_1$ is set up in the first component transmission 34. A second transmission ratio $I_2$ is set up in the second component transmission 36.

The output elements of the component transmissions 34, 36 are connected to the differential 18 of the driven axle, for example via a Cardan shaft.

Although the illustration in FIG. 1 is schematically similar to a rear-drive vehicle with a drive unit of a longitudinal design, it goes without saying that this illustration is intended to be purely exemplary. The methods according to the invention which are described below can be applied in equal measure to vehicles with a front drive, with a drive unit of a front transverse design, to medium-range motor vehicles, rear-mounted engine vehicles etc. In addition, the methods according to the invention can also be applied to all-wheel-drive vehicles.

FIG. 1 also shows a control unit 40 which is connected to the drive unit 20, the friction clutches 30, 32 and the component transmissions 34, 36. Here, the control unit 40 is configured to receive measured values from the corresponding units and actuate the corresponding units in an automated fashion.

The control unit 40 also receives a requested torque $T_w$ which is requested by a driver of the vehicle 10.

The method of functioning a drivetrain with such a double-clutch gearbox 22 has already been described at the beginning. Methods according to the invention for detecting a fault state are explained below in such a double-clutch gearbox 22, a brief explanation of the assumed rotational speeds and torques of the drive train being given below.

The output shaft of the drive unit 20 rotates at a rotational speed $n_M$ and makes available a torque $T_M$. In a corresponding way, a rotational speed $n_1$ and a torque $T_1$ occur at the output of the first friction clutch 30 and respectively the input of the first component transmission 34. A rotational speed $n_2$ and a torque $T_2$ occur at the output of the second friction clutch 32 and respectively at the input of the second component transmission 36. A rotational speed $n_A$ and a torque $T_A$ occur at the driven axle and respectively at a driven wheel 16. The ratio of the rotational speeds $n_M$ to $n_A$ depends on the transmission ratio I of the respectively active component transmission 34, 36 and on the transmission ratio of the differential 18.

A rotational speed $n_{NA}$ occurs at the non-driven axle and respectively at a non-driven wheel 12.

Embodiments of the methods according to the invention are described below in the form of flowcharts. It goes without saying here that the flowcharts preferably run as processes within a processor of the control unit 40 and are repeatedly restarted in a timed or interrupt-controlled fashion (for example in the form a loop which is restarted every 2 to 50 milliseconds). Wherever it is stated below that the method is aborted, it is meant that the respective method component aborts but is subsequently restarted again in the set-up rhythm.

In FIG. 2, a flowchart of an embodiment of a method according to the first aspect of the invention is illustrated and denoted by 50.

In a first step 52 it is detected that the torques $T_1$, $T_2$ which are transmitted via the first friction clutch 30 (also denoted by K1 below) and the second friction clutch 32 (also denoted by K2 below) are greater than a basic value GW. The basic value GW can correspond here to the engagement point or kiss point of the respective friction clutches. In other words, in step 52 it is detected whether the friction clutches 30, 32 are capable of transmitting torque. If this is not the case, the method aborts. However, if this condition is met, it is checked whether a gear stage is respectively engaged (step 54) in the two component transmissions 34, 36 (also denoted by TG1 and respectively TG2 below).

If a gear stage is engaged in just one of the component transmissions 34, 36 or in neither of the component transmissions 34, 36, the method aborts. Otherwise, in a further step 56 it is checked whether further input conditions are met. These input conditions relate, for example, to the presence of a brake signal, the level of the brake pressure, the size of the steering angle, the size of a rotational speed gradient and/or the rotational speed $n_1$ or $n_2$ of the input shaft of the active component transmission 34 or 36, respectively.

In a step 58 it is interrogated whether the difference between the speed or the rotational speed $n_{NA}$ of the non-driven axle (or of the non-driven wheel 12) and the speed or rotational speed of the driven axle (or of the driven wheel 16) is greater than a reference value (step 58). If this is not the case, the method aborts.

However, if the difference in rotational speed is greater than a reference value which can correspond, for example, to a slip at the driven axle of 5 to 70%, preferably 20 to 50%, in particular 25 to 35%, it is checked in a step 60 whether this state is present or lasts for a specific time period. This time may lie in a range of 25 to 800 milliseconds, in particular 50 to 500 milliseconds, and preferably in the range from 75 to 250 milliseconds (particularly preferably in the range from 100 to 200 milliseconds).

If the difference in rotational speed is above the reference value only for a relatively short time period, it is assumed that it may be a non-safety-related, short-term transition state or a measuring error. In this case, the method is aborted. However, if the difference in rotational speed is present for the specific time period, either one of the two friction clutches 30, 32 is opened (step 62) or both friction clutches 30, 32 are opened (step 64). The question as to which step 62, 64 is selected to solve the safety problem which is possibly present can depend, for example, on the amount by which the difference in rotational speed exceeds the reference value.

FIG. 2a illustrates a modification of the method illustrated in FIG. 2 according to a second aspect of the present invention.

In this context, in the method 50 in FIG. 2 the step 58 is replaced by a step 58'.

In the step 58', the rotational speed $n_G$ of the output shaft of the multi-step gearbox 22 is logically combined with a further parameter. The further parameter is selected from the rotational speed $n_m$ of the engine shaft, the rotational speed of the at least one drive shaft, the position of the clutches 30, 32 and the torques $T_1$, $T_2$ transmitted via the clutches 30, 32.

This logic combination is in turn compared with a reference value RW. A fault state is detected as a function of the comparison.

The method according to the second aspect of the present invention is advantageous in so far as the rotational speeds of the driven wheels or axles are not necessary. The method according to the second aspect of the invention is therefore preferably used if a vehicle is not equipped with sensors for the wheel speeds or axle speeds. In this case, the rotational speed of the output shaft of the gearbox can be used as a basic value for the calculation of the fault state. In automated gearboxes 22, the rotational speed of the output shaft is generally present, with the result that applying this method does not involve any additional structural complexity.

Since the rotational speed of the output shaft of the gearbox does not permit direct conclusions to be drawn about the slip at the driven axle, the logic combination with a further parameter is preferred, in order to permit a reliable conclusion to be drawn about a fault state which can lead to tensioning of the drive train and to "irreparable" loss of the frictional engagement of the driven axle.

In FIG. 3, an embodiment of the method according to the third aspect of the present invention is illustrated and denoted generally by 70.

Within the scope of the method 70, the clutch torques and the component transmissions 34, 36 are in turn checked in steps 72 and 74 (in a way which is identical to steps 52 and 54 in method 50 in FIG. 2).

In a step 76, the absolute values of the torques transmitted via the clutches 30, 32 are firstly calculated. As mentioned above, a torque is assumed to be positive if the rotational speed of the input element of the respective friction clutch 30, 32 is higher than the rotational speed of the output element. If the rotational speed of the input element is lower than the rotational speed of the output element, a negative sign is assumed.

In the step 76 it is then checked whether the sum of the absolute values calculated in this way is greater than a reference value which is the absolute value of the sum of the driver's requested torque $T_w$ and a threshold value. If the sum of the absolute values of the clutch torques is greater than the driver's requested torque $T_w$ (plus a threshold value) it is assumed that a fault state is present. In this case, it is checked in step 78 whether this state is present for a specific time period (similar to the procedure in step 60 of the method 50 in FIG. 2).

Steps 80 and 82 correspond in turn to steps 62 and 64 of the method 50 in FIG. 2, with either one or both of the friction clutches 30, 32 being opened in order to alleviate the assumed fault situation. The selection of the step 80 or 82 can in turn depend on how far the sum of the absolute values of the clutch torques exceeds the absolute value of the driver's requested torque plus the threshold value.

FIGS. 4 to 6 each show alternative embodiments or modifications of the method 70 in FIG. 3. Steps 70, 72 and 78 to 82 therein are each identical, only step 76 is respectively replaced by another step for detecting a fault state.

In FIG. 4, the sum of the absolute values of the clutch torques is also firstly calculated in a step 90 which replaces the step 76. It is then detected whether this sum is greater than a reference value which is the result of a multiplication of the absolute value of the sum of the driver's requested torque and a threshold value by a specific factor.

FIG. 5 shows a further modification of the method 70 in FIG. 3, wherein the step 76 is replaced by a step 92 in which the sum of the absolute values of the clutch torques is compared with a reference value which is independent of the driver's requested torque. The reference value can in turn be a fixed value or else a characteristic curve or a characteristic diagram and can therefore be dependent on various vehicle states.

FIG. 6 shows a further modification of the method 70, with the step 76 being replaced by a step 94. In the step 94, the sum of the absolute values of the clutch torques is compared with a reference value which is the sum of (i) the absolute value of the driver's requested torque $T_w$ multiplied by a factor, and (ii) the absolute value of a threshold value.

The factor in FIGS. 4 and 6 can be a fixed factor, but also a variable factor which depends, for example, on the respective driving state. This factor can therefore be, for example, smaller at relatively high speeds and larger at relatively low speeds.

In addition, the factor can, for example, depend on the torque of the drive engine (actual torque or setpoint torque) and/or on an ESP torque.

The factor in FIGS. 4 and 6 can respectively be a factor which is in the range from 0.8 to 4, in particular in the range from 1.8 to 3.5 and particularly preferably in the range from 2.3 to 3.0.

The method in FIG. 5 can in particular be used (for example as an alternative method) if the driver's requested torque is not available or is zero.

Figure 7:
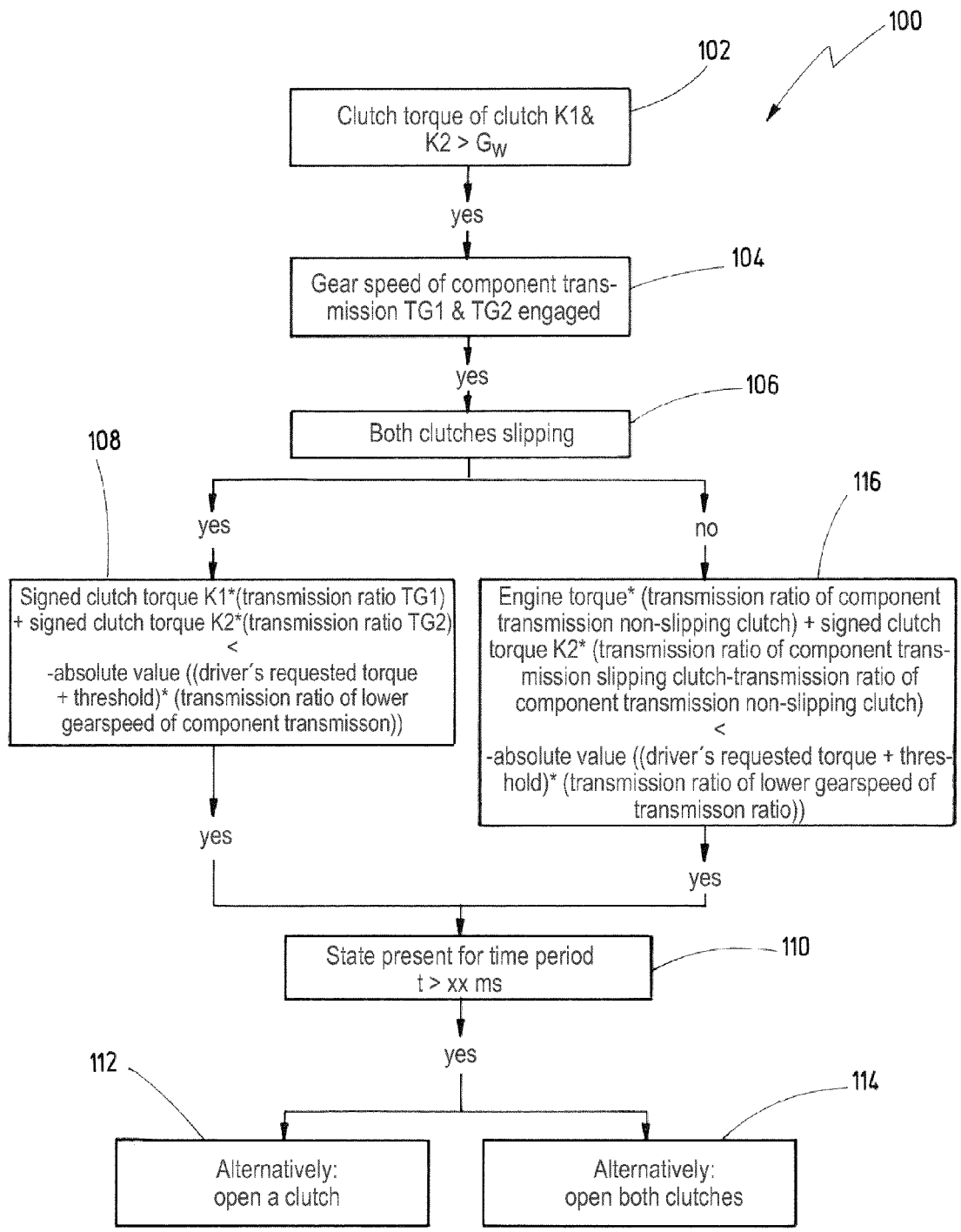
FIG. 7 shows a flowchart of a further preferred embodiment of a method according to the second aspect of the present invention.

In FIG. 7, a further embodiment of the method according to the third aspect of the present invention is illustrated and denoted generally by 100.

The method 100 initially comprises steps 102 and 104 which are identical to the steps 52, 54 of the method 50 in FIG. 2.

In a subsequent step 106 it is checked whether both friction clutches 30, 32 are in a slipping state, that is to say neither completely opened nor completely closed.

If this is the case, the method 100 continues with step 108.

In step 108, the sum is firstly formed from the signed clutch torque of the friction clutch 30 multiplied by the transmission ratio of the assigned component transmission 34, and the signed clutch torque of the friction clutch 32 multiplied by the transmission ratio of the assigned component transmission 36. This sum value is subsequently compared with the negative absolute value of the result of a multiplication of the (i) sum of the driver's requested torque TW and a threshold value by (ii) the transmission ratio of that component transmission 34, 36 in which the lower gear stage is selected.

If the sum value is equal or greater than the negative absolute value, the method is aborted. If the sum of the signed clutch torques multiplied by the respective transmission ratios is, however, smaller than the negative absolute value, it is in turn interrogated in a step 110 whether this state is present for a specific time period (comparable to the step 60 in method 50 in FIG. 2).

In a subsequent step 112 or 114 (comparable with steps 62 and 64), either one or both friction clutches 30, 32 is/are in turn opened in order to eliminate the assumed fault situation.

If it is detected in step 106 that just one of the two friction clutches 30, 32 is in a slipping state and the other of the friction clutches 30, 32 is closed, the step 116 is carried out.

In step 116 a similar interrogation is carried out to that in step 108. However, the torque which is transmitted via the closed friction clutch 30, 32 is calculated here by means of the torque $T_M$ which is output by the drive unit 20. The overall torque which is to be compared with the negative absolute value (as in step 108) is subsequently calculated by means of the sum of (i) the result of a multiplication of the driving torque (engine torque) $T_M$ by the transmission ratio of the component transmission which is assigned to the non-slipping friction clutch, and of the (ii) signed torque which is transmitted via the slipping clutch multiplied by the difference between the transmission ratio of the component transmission of the slipping friction clutch and the transmission ratio of the component transmission of the non-slipping friction clutch. This overall torque is, as stated, compared with the negative absolute value formed from the result of the multiplication of the sum of the driver's requested torque and of the threshold value by the transmission ratio of the component transmission in which the lower gear stage is selected.

If the overall torque is smaller than the negative absolute value, it is also assumed that a fault state is present here, wherein in step 110 it is in turn checked whether this state is present for a relatively long time period. The steps 112, 114 are identical as when the step 108 is carried out.

The method 100 in FIG. 7 is advantageous in so far as it is aimed at the torques present at the driven wheels, that is to say directly at that region of the drive train which is to be monitored (for loss of frictional engagement).

The invention can be carried out not only in the form of the exemplary embodiments described above. For example, in the context of the present invention the sensing of a rotational speed is generally also intended to include the sensing of a rotational speed gradient.

When the rotational speed gradient is sensed, the time reference can also better be included in the respective fault-detection methods with respect to the processes carried out during a change of gear speed. Reference to the sensing of a rotational speed is therefore also to include the sensing of a rotational speed gradient here.

In addition, it goes without saying that, for example the sensing of the speed of the vehicle can also be equivalent to the sensing of the rotational speed of a driven wheel.

Therefore, in particular with the present invention the sensing of the rotational speed of a specific part is generally also to include the sensing of the rotational speed of a part which is connected in a rotationally fixed fashion thereto or the speed of a part which is influenced thereby.

The invention claimed is:

1. Method for detecting a fault state in an automated motor vehicle gearbox, in which method driving torque can be transmitted to at least one driven wheel via a first and a second parallel branch, wherein a clutch is provided in each branch, having the steps:
   - sensing of the torque transmitted via the first clutch;
   - sensing of the torque transmitted via the second clutch;
   - sensing whether a gear speed is engaged in both branches; and
   - detection of a fault state if a gear speed is engaged in both branches and if a sum of the torques transmitted via the first and second clutches is greater than a reference value, wherein the fault state is detected under the additional condition that the absolute value sum of an absolute value of the torque transmitted via the first clutch and of an absolute value of the torque transmitted via the second clutch is greater than a reference value.

2. Method according to claim 1, wherein the reference value is a function of the requested torque which is requested by a driver of the motor vehicle.

3. Method according to claim 2, wherein the reference value is formed by the absolute value of the sum of the driver's requested torque and a threshold value.

4. Method according to claim 2, wherein the reference value is formed by the result of a multiplication of an absolute value of a sum, which is formed from the driver's requested torque and a threshold value, by a factor.

5. Method according to claim 2, wherein the reference value is formed by the sum of the result of a multiplication of an absolute value of the driver's requested torque by a factor and of an absolute value of a threshold value.

6. Method according to claim 1, wherein the reference value is a value which is independent of the driver's requested torque.

7. Method according to claim 1, wherein the fault state is detected under the additional condition that a negative output torque resulting at the driven wheel is not too large.

8. Method according to claim 1, wherein the fault state is detected under the additional condition that both clutches are in a slipping state.

9. Method according to claim 8, wherein the fault state is detected under the additional condition that the sum of a signed torque transmitted via the first clutch and multiplied by the transmission ratio which has been set up in the assigned branch, and of a signed torque transmitted via the second clutch and multiplied by the transmission ratio, which has been set up in the assigned branch, is smaller than a reference value which is the negative absolute value of the result of a multiplication of the sum of the driver's requested torque and a threshold value by the lower of the transmission ratios.

10. Method according to claim 1, wherein the fault state is detected under the additional condition that just one of the two clutches is in a slipping state.

11. Method according to claim 10, wherein the fault state is detected under the additional condition that the sum of the result of a multiplication of a torque, made available by the drive unit, by the transmission ratio which is set up in the branch which is assigned to the non-slipping clutch, and of the result of a multiplication of a signed torque, transmitted via the slipping clutch, by the difference between the transmission ratio which is set up in the branch which is assigned to the slipping clutch and the transmission ratio which is set up in the branch which is assigned to the non-slipping clutch, is smaller than a reference value which is the negative absolute value of the result of a multiplication of the sum of the driver's requested torque and a threshold value by the lower of the transmission ratios.

12. Method according to claim 1, wherein a safe state is brought about when a fault state is sensed in the gearbox, having the step of at least partially opening at least one of the clutches of the gearbox.

* * * * *